United States Patent [19]

Hart

[11] Patent Number: 5,611,869
[45] Date of Patent: Mar. 18, 1997

[54] REFINERY VESSEL CLEANING TREATMENT

[75] Inventor: Paul R. Hart, The Woodlands, Tex.

[73] Assignee: BetzDearborn Inc., Trevose, Pa.

[21] Appl. No.: 548,215

[22] Filed: Oct. 25, 1995

[51] Int. Cl.⁶ .............................. B08B 9/00; C10G 33/04
[52] U.S. Cl. ................. 134/22.19; 134/22.1; 134/22.11; 134/22.12; 134/22.14; 134/22.18; 134/40; 208/188; 252/331
[58] Field of Search .............................. 134/22.1, 22.11, 134/22.12, 22.14, 22.18, 22.19, 40; 208/177, 188; 252/331

[56] References Cited

U.S. PATENT DOCUMENTS

| | | | |
|---|---|---|---|
| 2,557,081 | 6/1951 | Groote et al. | 252/331 |
| 3,288,770 | 11/1966 | Butler | 526/204 |
| 4,089,803 | 5/1978 | Bessler | 252/344 |
| 4,160,742 | 7/1979 | Raman | 252/344 |
| 4,416,754 | 11/1983 | Merchant, Jr. et al. | 204/561 |
| 4,650,827 | 3/1987 | Becker et al. | 524/801 |
| 4,737,265 | 4/1988 | Merchant, Jr. et al. | 208/188 |
| 4,800,039 | 1/1989 | Hassick et al. | 252/181 |
| 4,949,743 | 8/1990 | Broom | 137/13 |
| 5,085,710 | 2/1992 | Goss | 134/22.14 |
| 5,288,789 | 2/1994 | McCarthy | 435/243 |
| 5,330,581 | 7/1994 | Syninek | 134/40 X |
| 5,356,482 | 10/1994 | Mehta et al. | 134/22.1 |

*Primary Examiner*—Arlen Soderquist
*Attorney, Agent, or Firm*—Alexander D. Ricci; Philip H. Von Neida

[57] ABSTRACT

The present invention provides for methods and compositions for cleaning oil and sludge from a refinery vessel and for separating the resulting emulsion formed by the cleaning composition and the oil and sludge. The cleaner composition uses an aqueous solution of an alkylphenol-formaldehyde resin alkoxylate, a poly(ethylene glycol)dialkyl ester and a solvent selected from the group consisting of a $C_1$ to $C_8$ alcohol, glycol, and glycol ether.

17 Claims, No Drawings

5,611,869

REFINERY VESSEL CLEANING TREATMENT

FIELD OF THE INVENTION

The present invention relates to methods and compositions for cleaning grossly drained refinery vessels of their remaining oil and sludge. The present invention further relates to additional stepwise methods for separating the oil and sludge from the cleaning solution.

BACKGROUND OF THE INVENTION

Refinery operating units are made up of various types of vessels such as tanks, heat exchangers, catalytic reactors, flowlines, distillation towers, desalters, crackers, hydrotreaters and the like. Periodically, these vessels must be cleaned so they can be inspected and maintained to prevent their causing environmental harm and to ensure the continued operational efficacy of the refinery. Cleaning of these vessels typically begins with draining of the vessel of any hydrocarbon being refined which leaves behind oils and sludge which then must be contended with.

Currently, federal environmental laws regulating waste disposal provide incentive for efficient chemical methods for cleaning vessels. Cleaning solutions typically employ ionic surfactants to stabilize oil-in-water emulsions via charge repulsion. These types of surfactants can cause foam and upset the charge balance in downstream water clarification systems. Certain nonionic cleaners employ nonylphenol ethoxylate surfactants which are non-biodegradable and toxic to biotreatment microbes. Other nonionic cleaners use high HLB surfactants (typically 10–20 HLB) which cause foam and require the use of a separate antifoam to prevent foam-overs in open vessels, as well as use of a separate extraction oil to soften heavy hydrocarbons.

Other cleaners use terpene or aromatic type solvents as softeners or extractants for heavy oils. These components can be toxic and/or carcinogenic as well as flammable. They may also mask the odor of other harmful compounds such as benzene. Certain of these cleaners are alkaline or acidic and can be corrosive, while others are oxidizing.

SUMMARY OF THE INVENTION

The present invention provides for methods and compositions for cleaning a refinery vessel of oil and sludge and for subsequently separating the cleaning solution from the oil and sludge.

The cleaner of the present invention avoids the problems of prior art cleaners. The components of the cleaner are nonionic materials which avoid foaming and will not upset downstream charge balance. The inventive composition contains materials that are biodegradable or non-toxic to biotreatment microbes. The cleaner composition also contains no flammable components, no odor masking agents and no aromatics which can be both toxic and carcinogenic. The inventive cleaner is pH neutral and is non-oxidizing.

DESCRIPTION OF THE RELATED ART

U.S. Pat. No. 4,949,743 teaches processes for fluidizing oily heavy slurries chosen from slurries of catalyst fines in hydrocarbon, coke slurries in hydrocarbon and asphalt residues in hydrocarbon. The processes comprise heating with effective mixing of oily heavy slurries to at least 140° F. thereby forming a heated heavy slurry. A fluidizing agent is then added to the heated heavy slurry and this agent comprises water, an ethoxylated nonylphenol-formaldehyde resin, a surfactant having an HLB of between 2.0 and 25.0, and a liquid organic solvent.

U.S. Pat. No. 5,085,710 teaches a process for chemically cleaning sludge deposits from oil storage tanks. The process comprises draining oil from the storage tank, adding water with a nonionic surfactant, and adding diluent to recover the hydrocarbons. The tank contents are heated to 145° F. to 180° F. and when no sludge remains on the tank bottom, the diluent layer can be drained into the crude unit and the aqueous layer into the API unit.

U.S. Pat. No. 5,356,482 teaches a process for decontaminating process vessels and auxiliary equipment in fluid communication therewith to remove benzene and hazardous solid, liquid and gaseous chemical contamination to permit entry by humans into the vessel. This process comprises contacting the contamination at temperatures of 160° F. to 230° F. with an aqueous solution containing a terpene extractant chemical and a surfactant having an HLB of 6 to 18. This solution is then circulated to contact the contaminants and dispersed as vapor to condense on the surfaces of the vessel to breakdown and trap contaminants. The solution is then separated from the surface to remove the benzene and the contaminants.

DETAILED DESCRIPTION OF THE INVENTION

The present invention relates to methods and compositions for cleaning a refinery vessel of oil and sludge and for separating the resulting emulsion formed by the oil, sludge and cleaner solution comprising the steps of (a) adding to the refinery vessel an effective cleaning amount of a composition which comprises an aqueous solution of an alkylphenol-formaldehyde resin alkoxylate, a poly(ethylene glycol)dialkyl ester, and a solvent selected from the group consisting of a low molecular weight alcohol, glycol, and glycol ether; whereafter the emulsion is transported to a separate vessel; and (b) adding to the emulsion an emulsion-breaking amount of an aqueous solution of a water-soluble, cationic polyalkanolamine condensate or polyamine/aluminum salt.

The alkylphenol-formaldehyde resin alkoxylates generally have molecular weights in the range from about 500 to about 5000 with a range of about 1000 to about 2500 preferred. The alkyl group may be linear or branched and have 1 to about 24 carbon atoms with a range of about 4 to about 9 carbon atoms preferred. The alkoxylation of the alkylphenol-formaldehyde resin may be by $C_2$ to $C_4$ alkylene oxides. Preferred resins are nonylphenol-formaldehyde condensates with 3 to 10 moles phenol and 1 to 5 moles of ethylene oxide (EO) per mole of phenol. More preferably, the resin is a nonylphenol-formaldehyde condensate with 5 moles phenol and 3 moles EO per mole of phenol, such as Witbreak DRC-164 available from Witco Corp. This component, for purposes of the present invention, is hereinafter called the "resin".

The poly(ethylene glycol)dialkyl esters generally have molecular weights in the range from about 500 to about 2500 with a range of about 800 to about 1600 preferred. The dialkyl group may be linear or branched and has from 12 to about 24 carbon atoms with a range of about 15 to about 22 carbon atoms preferred. The preferred esters are di-fatty acid esters of a 200 to 1200 daltons poly(ethylene glycol), "PEG". A di-tallow ester of a poly(ethylene glycol) of 600 daltons, available as PEG 600 DOT, is most preferred. This component, for purposes of the present invention, is hereinafter called the "ester".

The solvent component of the composition is selected from the group consisting of a low molecular weight alcohol, a glycol and a glycol ether. Preferably the alcohol and glycol have 1 to about 8 carbon atoms. The glycol ether is preferably a $C_1$ to $C_4$ ether of a $C_2$ to $C_6$ glycol or di-glycol, more preferably with 5 to 10 carbon atoms per OH group and most preferably the butyl ether of di(ethylene glycol), available from Union Carbide as Butyl Carbitol®. This component, for purposes of the present invention, is hereinafter called the "solvent".

The weight ratio of the resin to the ester to the solvent ranges from 1–10:1–10:1–10 with a ratio of 3:4:6 preferred. The composition is conveniently prepared in water. The actives ratio can vary with the type and amount of sludge and oil present in the vessel to be cleaned. For instance, the resin contributes an ability to remove sludges and heavy residual oils from the vessel walls, typically above their melting point in the 150° to 200° F. range. Formulations for heavier oil applications would therefore contain relatively more resin. The ester component contributes more to the ability to keep high levels (up to 10 to 30%) of the lighter gas oils, naphthas, and gasolines stably emulsified in water. Formulations for lighter oil applications would therefore contain relatively more ester. The solvent component contributes more to penetrating heavy oil deposits and softening them which allows for a lower temperature for the cleaning composition. In an alternative formulation, the solvent component can be omitted if an oil base is used. However, the oil should be one that does not itself constitute a contaminant. Such oils include severely hydro-treated mineral oil (e.g., gland oil) or any number of animal or plant derived oils (e.g., fish oil, caster oil, banana oil).

The emulsion breaking compound is a water-soluble, cationic polyalkanolamine or polyamine/aluminum salt which is selected from the group including but not limited to alkanolamine condensates such as poly(ethanolamine), and poly(diallyldimethyl ammonium chloride), "poly(DADMAC)" blended with an amphoteric salt such as aluminum chlorohydrate. The poly(mono, di or triethanolamine) has a molecular weight of 600 to 100,000 daltons in a 5 to 50% aqueous solution. The poly(DADMAC) preferably is 60 to 1000 kilodaltons molecular weight and may be prepared as per U.S. Pat. No. 3,288,770, the contents of which are wholly incorporated by reference to herein.

For purposes of the present invention, sludge can be generally defined as water and various inorganic solids such as sand, silt, clay, and rust that are coated or intimately commingled with oil and organic solids such as asphaltenes, waxes, resins, and gums. Oil can be generally defined as any petroleum based fluid such as crude oil, heavy vacuum tower bottoms, catalytic cracker resid, light gas oil, naphtha or gasoline.

The preferred cleaner composition comprises:

15% nonylphenol-formaldehyde resin ethoxylate with 5 moles phenol and 3 moles ethylene oxide per phenol, 80% in hydrocarbon solvent 20% di-tallow ester of 600 MW poly(ethylene glycol)

30% butyl ether of di(ethylene glycol)

35% water

In the method of cleaning a refinery vessel, 0.5 to 5% of the cleaner composition, preferably 1 to 2%, is added to the wash water. The wash water, which may be heated in a range of 100° to 200° F. is jetted in and splashed about and/or allowed to fill the refinery vessel to wet the bottom of the trays. The water is then pumped around and around in a turbulent manner until the vessel is clean or the water is saturated with oils and solids (typically at about 30%). The emulsion is then pumped off to a break tank.

The preferred emulsion breakers for use in the present invention comprise:

35% poly(ethanolamine), 46% solution, aq.

65% water or 12.5% poly(DADMAC), 18% solution, aq.

25.0% $Al_2Cl(OH)_5$, 50% solution, aq.

62.5% water

The emulsion breaker is added to the emulsion on its way to tankage in an amount ranging from 0.1% to about 10% to separate the oil and the solids from the water in the emulsion. The emulsion cools to ambient outdoor temperatures in tankage, and the breaker keeps working even at this lower temperature. The de-oiled water is then sent to the waste water treatment system, and the recovered oil recycled to a refinery process or disposed of in an appropriate manner.

The emulsion breaker can also be used to determine the amount of oil emulsified in the wash water during the course of the washing. By taking a small sample of the emulsion and breaking it, the operator can determine when the solution is saturated enough to pump it to tankage.

For purposes of the present invention, the refinery vessels include but are not limited to tanks, heat exchangers, flowlines, distillation towers, desalters, crackers, hydrotreaters, or other vessels in contact with hydrocarbons, and need to be "decontaminated".

The invention will now be described with reference to a number of specific examples which are to be regarded solely as illustrative, and not as restricting the scope of the invention.

Heavy vacuum resid or light gas oil were mixed with water in a test tube at temperatures ranging from 150° to 200° F. This mixture was dosed with cleaner, shaken, set in a bath ranging from 150° to 200° F. Observations were made for cleanliness of glass walls (area % clean), separation time, and initial foam height (as % of liquid level). The results of this testing are presented in Tables I and II.

TABLE I

| | Test tube cleaning results 10% heavy vacuum resid (200° F.) | | |
|---|---|---|---|
| Cleaner Raw material at 1.2% active | Extracted from walls (%) | Emulsion stability (min.) | Foam head (%) |
| A Pluronic ® P-84 | 90 | 15 | 50 |
| B NP—$EO_5$ | 50 | 30 | 10 |
| C NP—$EO_{10}$ | 70 | 15 | 10 |
| D NP—$EO_{20}$ | 90 | 1 | 50 |
| E DDBSA-Amine | 90 | 1 | 80 |
| F Imidazoline fatty acid | 0 | 1 | 10 |
| G Witbreak DRC-164 | 90 | 30 | 10 |
| H PEG 400 MOT | 30 | 30 | 10 |
| I PEG 400 DOT | 30 | 60 | 0 |
| J PEG 600 DOT | 30 | 120 | 0 |
| K Butyl Carbitol ® | 0 | 0 | 0 |
| L A + G, 1:1 | 95 | 30 | 30 |
| M A + J, 1:1 | 30 | 60 | 20 |
| N G + J, 1:1 | 95 | 120 | 0 |
| O G + J + K, 1:1:1 at 1.8% | 100 | 120 | 0 |

TABLE II

Test tube cleaning results
15% light gas oil (150° F.)

| Cleaner Raw material at 1.2% active | Extracted from walls (%) | Emulsion stability (min.) | Foam head (%) |
|---|---|---|---|
| A Pluronic® P-84 | 100 | 15 | 30 |
| B NP—EO$_5$ | 100 | 10 | 30 |
| C NP—EO$_{10}$ | 100 | 10 | 30 |
| D NP—EO$_{20}$ | 100 | 10 | 30 |
| E DDBSA-Amine | 100 | 15 | 40 |
| F Imidazoline fatty acid | 70 | 10 | 10 |
| G Witbreak DRC-164 | 100 | 15 | 20 |
| H PEG 400 MOT | 100 | 30 | 10 |
| I PEG 400 DOT | 100 | 60 | 0 |
| J PEG 600 DOT | 100 | 120 | 0 |
| K Butyl Carbitol | 100 | 0 | 0 |
| L A + G, 1:1 | 100 | 15 | 20 |
| M A + J, 1:1 | 100 | 30 | 0 |
| N G + J, 1:1 | 100 | 120 | 0 |
| O G + J + K, 1:1:1 at 1.8% | 100 | 120 | 0 |

A: Pluronic® P-84 is and EO/PO block copolymer available from BASF

B–D: NP-EO$_x$ is nonylphenol with x moles of ethylene oxide

E: DDBSA-amine is an amine neutralized dodecylbenzene sulfonic acid

G. Witbreak DRC-164 is a nonylphenol-formaldehyde condensate with 5 moles phenol and 3 moles ethylene oxide per mole of phenol, available from Witco Corp. as 80% solution in hydrocarbon solvent H–J: PEG XOO is the mono (M) or di (D) tallow ester of XOO MW poly(ethylene glycol)

K: Brand of butyl ether of di(ethylene glycol) from Union Carbide

As demonstrated in Table I, the inventive composition (designated O) of nonylphenol-formaldehyde resin ethoxylate, poly(ethylene glycol) ditallow ester, and Butyl Carbitol solvent proved the most effective at cleaning and forming a stable emulsion among all the other materials tested. The use of the resin and ester ingredients together (N) proved better at cleaning the heavy sludge oil and in forming a stable emulsion than any individual ingredient or any other two component combination (L and M).

The results presented in Table II demonstrate that the inventive cleaner compositions (N and O) are as or more effective than the other materials at keeping even light gas oil dispersed. Superior emulsion stability was achieved while the ability to remove heavy sludge without foaming was maintained.

Although these emulsions will remain stable for at least two hours under static conditions, they are easily broken by the addition of small amounts of the inventive breakers.

Further testing was performed utilizing 0.6% cleaner G, 0.8% cleaner J, and 1.2% of cleaner K added to heavy vacuum resid or light gas oil in water in a test tube at temperatures ranging from 150° to 200° F. The mixture was shaken, cooled to 75° F., then dosed with breaker and observed for separation. These results are presented in Tables III and IV.

TABLE III

Emulsion breaker results
10% heavy vacuum resid

| Breaker | % Added | Separation after 5 min. (%) | Water Quality | Oil Quality |
|---|---|---|---|---|
| P | 0.2 | 0 | brown milk | none |
| P | 0.4 | 100 | slight haze | none |
| P | 0.8 | 100 | slight haze | cream |
| Q | 0.2 | 0 | brown milk | cream |
| Q | 0.4 | 0 | brown milk | none |
| Q | 0.8 | 100 | cloudy | lump |

TABLE IV

Emulsion breaker results
15% light gas oil

| Breaker | % Added | Separation after 5 min. (%) | Water Quality | Oil Quality |
|---|---|---|---|---|
| P | 0.2 | 50 | cloudy | cream |
| P | 0.4 | 100 | slight haze | cream |
| P | 0.8 | 100 | slight haze | cream |
| Q | 0.2 | 0 | milk | none |
| Q | 0.4 | 50 | cloudy | clear |
| Q | 0.8 | 100 | slight haze | clear |

Breaker P is a 16% aqueous solution of a poly(ethanolamine) available from Witco in a 46% aqueous solution as Witbreak RTC-326.

Breaker Q is 2.25% of a medium molecular weight poly(DADMAC) and 12.5% Al2Cl(OH)$_5$.

As demonstrated in Table III, 0.4% of the 16% active poly(ethanolamine) and 0.8% of the 15% active poly(DADMAC)/aluminum chlorohydrate blend were able to achieve 100% separation after 5 minutes of the 10% oil and water emulsion formed from heavy vacuum resid. This is also demonstrated in Table IV for the 15% emulsion formed by cleaning light gas oil.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for cleaning a refinery vessel of oil and sludge and for separating the resulting emulsion formed by said cleaning comprising the steps of (a) adding to said refinery vessel an effective cleaning amount of a composition which comprises an aqueous solution of an alkylphenol-formaldehyde resin alkoxylate, a poly(ethylene glycol)dialkyl ester, and a solvent selected from the group consisting of a $C_1$ to $C_8$ alcohol, glycol, and glycol ether, wherein the resulting emulsion of oil, sludge, and cleaner is transported to a separate vessel; and (b) adding to said emulsion an emulsion-breaking amount of an aqueous solution of a poly(alkanolamine) condensate or polyamine/aluminum salt blend.

2. The method as claimed in claim 1 wherein said alkylphenol-formaldehyde resin alkoxylate has a molecular weight ranging from about 500 to about 5000.

3. The method as claimed in claim 1 wherein said alkylphenol-formaldehyde resin alkoxylate has an alkyl group ranging from 1 to about 24 carbon atoms.

4. The method as claimed in claim 1 wherein said alkylphenol-formaldehyde resin alkoxylate has 3 to 10 moles of phenol and 1 to 5 moles of alkylene oxide per mole of phenol.

5. The method as claimed in claim 1 wherein the alkoxylation of said alkylphenol-formaldehyde resin is with $C_2$ to $C_4$ alkylene oxides.

6. The method as claimed in claim 5 wherein said alkoxylation is ethoxylation.

7. The method as claimed in claim 6 wherein said alkyl group on said alkylphenol-formaldehyde resin ethoxylate is nonyl and said resin has 5 moles of nonyl phenol and 3 moles of ethylene oxide per mole of nonyl phenol.

8. The method as claimed in claim 1 wherein said alkyl group on said poly(ethylene glycol)dialkyl ester is linear or branched with from 12 to 24 carbon atoms.

9. The method as claimed in claim 1 wherein said poly(ethylene glycol) on said poly(ethylene glycol)dialkyl ester has a molecular weight of from 200 to 1200 daltons.

10. The method as claimed in claim 9 wherein said poly(ethylene glycol)dialkyl ester is a di-tallow ester of 600 dalton poly(ethylene glycol).

11. The method as claimed in claim 1 wherein said glycol is a $C_1$ to $C_8$ glycol.

12. The method as claimed in claim 1 wherein said glycol ether is a $C_1$ to $C_4$ ether of a $C_2$ to $C_8$ glycol or diglycol.

13. The method as claimed in claim 12 wherein said glycol ether is butyl ether of di(ethylene glycol).

14. The method as claimed in claim 1 wherein said poly(alkanolamine) is selected from the group consisting of a poly(mono, di and triethanolamine) with a molecular weight of 6000 to 100,000 daltons in a 5 to 50% aqueous solution.

15. The method as claimed in claim 1 wherein said polyamine/aluminum salt is a blend of poly(diallyl dimethyl ammonium chloride) of molecular weight 60 to 1,000 kilodaltons and aluminum chlorohydrate in a 5 to 50% aqueous solution.

16. The method as claimed in claim 1 wherein said cleaning composition is added to said refinery vessel in an amount ranging from about 0.5 to about 5% of the water present in said refinery vessel.

17. The method as claimed in claim 1 wherein said emulsion breaker is added to said emulsion in an amount from about 0.5% to about 2.5% of said emulsion.

* * * * *